May 3, 1949.　　　　L. R. EVANS　　　　2,469,160
WORK STOP FOR USE WITH COLLETS
Filed Sept. 12, 1947　　　　　　　　　　　　　2 Sheets-Sheet 1

INVENTOR.
Leigh R. Evans
BY Parker, Birchwow Farmer
Attorneys.

May 3, 1949.　　　　　L. R. EVANS　　　　　2,469,160
WORK STOP FOR USE WITH COLLETS
Filed Sept. 12, 1947　　　　　　　　　　　　　　2 Sheets-Sheet 2
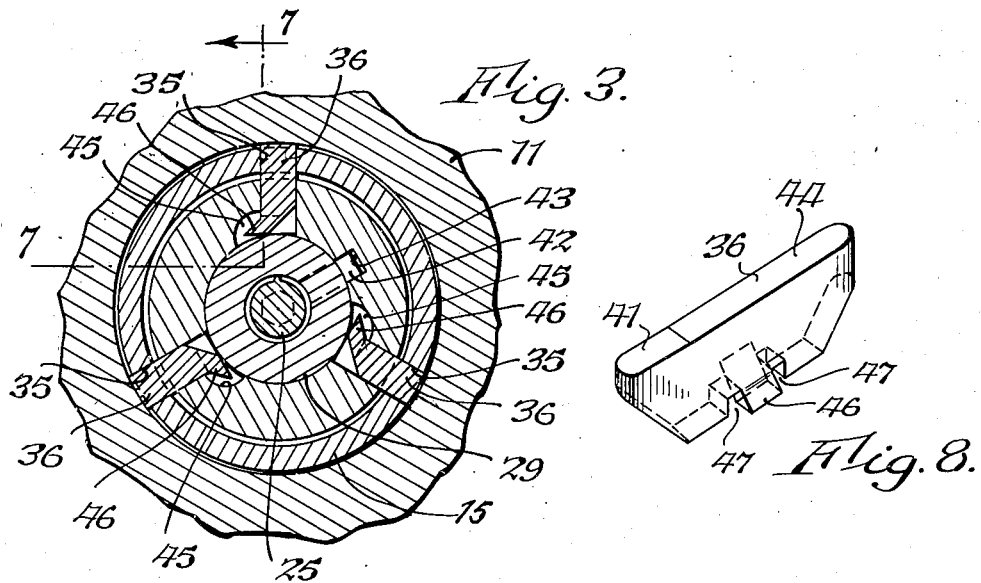
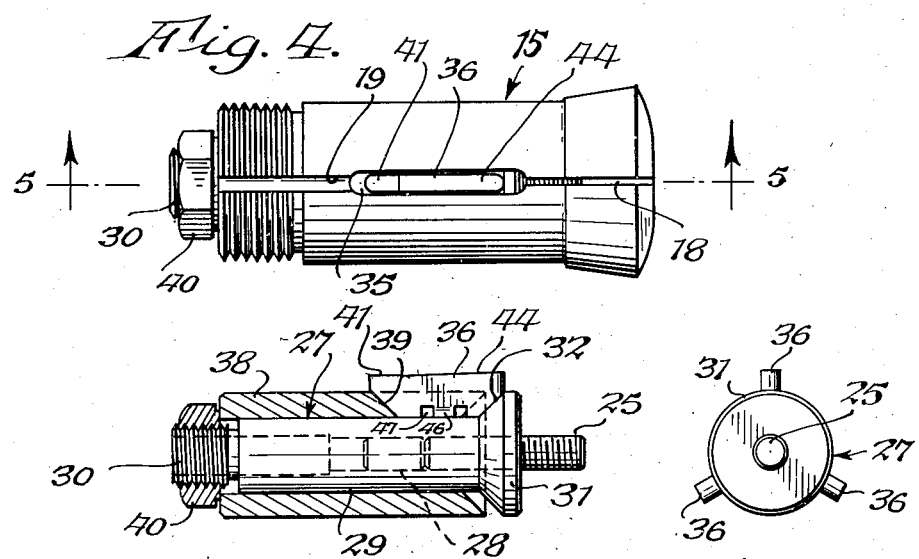
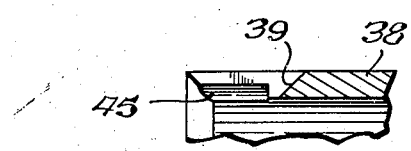
INVENTOR.
Leigh R. Evans
BY
Parker, Rockmow & Farmer
Attorneys.

Patented May 3, 1949

2,469,160

UNITED STATES PATENT OFFICE 2,469,160

WORK STOP FOR USE WITH COLLETS

Leigh R. Evans, Elmira, N. Y., assignor to Hardinge Brothers, Inc., Elmira, N. Y.

Application September 12, 1947, Serial No. 773,542

12 Claims. (Cl. 279—51)

This invention relates to improvements in work stops for use on lathes and other machines employing collets for holding the work.

Work stops have been mounted on collets or chucks in such a manner as to be movable therewith and such work stops may have the desired degree of accuracy when the work is of uniform diameter. Commercial rods and bars, however, vary considerably in diameter and if the work to be clamped in the collet is, for example, several thousandths of an inch under size, the collet must be drawn into the lathe spindle to a greater extent, thus drawing the stop inwardly from the work supporting end of the spindle to a similar extent. If the work is several thousandths of an inch over size, the collet will not be drawn into the lathe spindle to the same extent as when the collet is operating on work of the correct diameter, and consequently, the stop will also be nearer to the work receiving end of the lathe spindle. Consequently, when a high degree of accuracy in the location of the stop is required and the work varies slightly in diameter, such stops secured to the collets themselves cannot be successfully used.

One of the objects of this invention is to provide a work stop for collets employed in machines having rotary spindles and in which the stop will be accurately positioned with reference to the work holding end of the machine spindle, regardless of variations in diameter of the work. Another object of this invention is to provide a work stop for machines of this type which is capable of operating with a much higher degree of accuracy than collet stops heretofore commonly employed, and which is also positive and reliable in its action. Another object is to provide a work stop which is arranged within the collet, and which has means for gripping the lathe spindle to ensure accurate positioning of the work with reference to the spindle of the machine. A further object is to provide a stop of this type which includes a plurality of spindle gripping parts which extend through the usual slots between the spring fingers of a collet, and which are pressed into engagement with the lathe spindle by means extending into the collet. A further object is to provide a work stop in a machine of this type in which the locking mechanism is arranged in close proximity to the work supporting end of the spindle to avoid inaccuracies due to the resilience of various parts of the stop. Another object is to provide work stop in which the locking mechanism is arranged to cooperate with a part of the tapered bore of the spindle so that the stop is secured in place by a wedging action, as well as by frictional engagement with the spindle. Other objects and advantages of this invention will be apparent from the following description and claims.

In the accompanying drawings:

Fig. 3 is a fragmentary transverse section thereof, on line 3—3 of Fig. 2.

Fig. 4 is an elevation of a collet having my improved stop means applied thereto.

Fig. 5 is a central sectional elevation, taken partly on line 5—5, Fig. 4, with the collet omitted, and showing the stop mechanism separate from the collet.

Fig. 6 is an end elevation of the structure shown in Fig. 5.

Fig. 7 is a fragmentary sectional view, on line 7—7, Fig. 3.

Fig. 8 is a perspective view of one of the locking blades of the stop mechanism.

Figure 1:
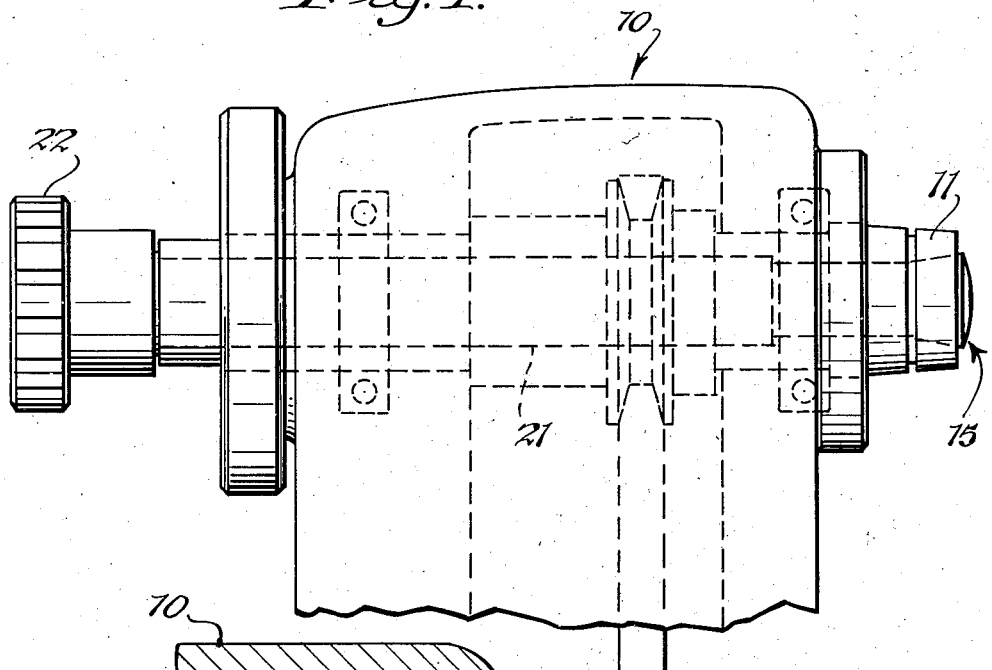
Fig. 1 is a fragmentary elevation of the head stock of a lathe in connection with which my improved stop is employed.
Figure 2:
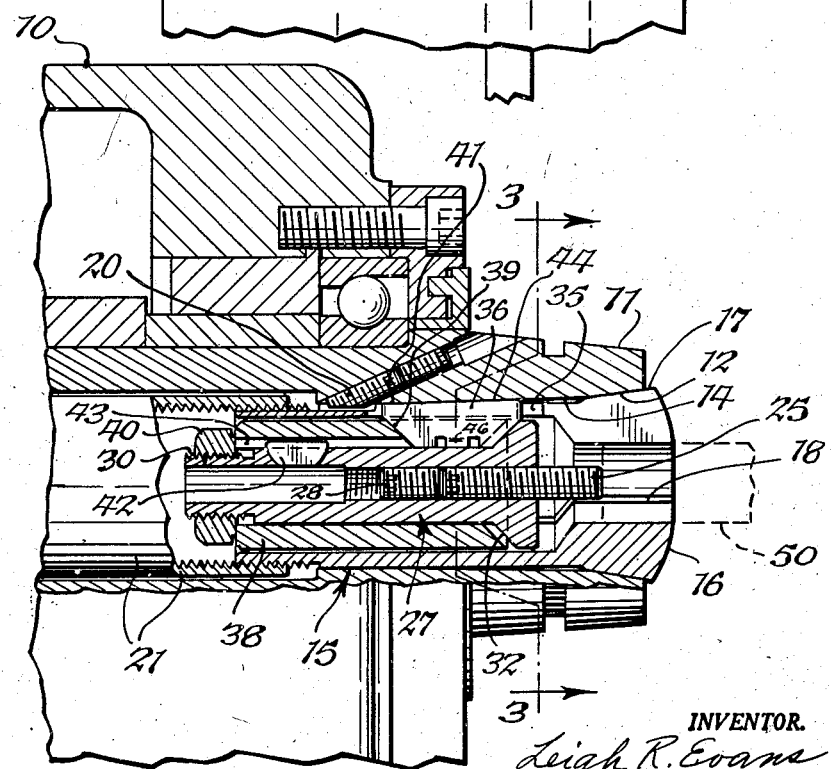
Fig. 2 is a fragmentary central sectional elevation thereof, on an enlarged scale, showing my improved stop in operative relation to a collet and a spindle.

My improved stop mechanism may be applied to any machine having a spindle on which the workpieces may be supported, and in the accompanying drawings, I have, by way of example, illustrated the invention as applied to a lathe having a headstock 10 in which a spindle 11 is rotatably mounted in any suitable manner. The work supporting end of the spindle, as shown in Fig. 2, has an internal frusto-conical bore 12 which extends from the end of the spindle to a slightly tapering bore 14. Both of these bores are formed for cooperation with a collet 15 having the usual spring fingers terminating at their outer ends in work gripping jaws 16 having substantially frusto-conical or tapered outer surfaces 17 formed to cooperate with the tapered bore 12 of the lathe spindle. The bore 14 which has less taper than the bore 12 permits the spring fingers to move outwardly when the collet is moved into releasing position, i. e., to the right in Fig. 2. The spring fingers are spaced from each other by means of the usual slots 18. The collet may be provided with a keyway 19 into which a key member 20 in the spindle 11 may enter to cause the collet to turn with the spindle. A collet of any other suitable type may be provided. 21 represents a collet draw bar or tube to which the inner end of the collet is secured, for example, by means of a threaded engagement with the inner end of the collet. This draw bar or tube may be actuated to move the collet into and out of work engaging positions through its knob or handwheel 22. All of the parts thus far described have heretofore been used in connection with lathes and other machines, and of themselves, do not constitute a part of this invention.

My improved work stop includes a work engaging member which may be of any suitable or desired form, that shown being in the form of a threaded rod or screw 25 adjustably mounted on a draw bolt 27 which forms a part of the mechanism for locking the stop with relation to the spindle of the machine. It will be understood, however, that the draw bolt itself may be used as a work stop to limit the extent to which work may be inserted into said collet. In the particular construction illustrated, the draw bolt has an axially extending threaded hole in which the stop member 25 has a threaded engagement for adjusting the same lengthwise relatively to the draw bolt, and 28 represents a locking screw which may be turned into engagement with the stop member or screw 25 to hold the stop screw securely in any desired position. The draw bolt is provided with a cylindrical body portion 29 terminating at one end thereof in a screw-threaded part 30 and having an enlarged head 31 at the other end thereof, the head having a tapered or frusto-conical portion 32 terminating at the cylindrical portion 29 of the draw bolt.

The locking of the draw bolt and of the work stop member 25 mounted thereon to the spindle 11 may be effected in any suitable manner by means of locking parts which extend outwardly through slots of the collet into engagement with the bore of the spindle, and if desired, the slots 18 of the collet may be enlarged as indicated at 35, to permit the locking parts to pass through the slots. These locking parts are preferably in the form of leaves or plates 36 which preferably correspond in number to the number of slots in the collet, and the inner surfaces of the locking leaves are provided with inclined or bevelled surfaces at opposite ends thereof, one of these surfaces being formed to contact with the frusto-conical or tapering surface 32 of the draw bolt. The other tapering surface of each leaf is formed to cooperate with a sleeve 38 formed to fit slidingly over the cylindrical surface 29 of the draw bolt. This sleeve is provided with radial slots terminating at one end thereof, the slots being formed to receive the locking leaves 36 and the other end of each slot is provided with a tapering face 39 formed to engage a tapering or inclined face of a locking leaf. Consequently, it will be evident from an inspection of Figs. 2 and 5 that if the sleeve is moved to the right, the inclined face 39 thereof cooperating with the tapering face 32 of the locking bolt will force the locking leaves 36 outwardly. The draw bolt and the sleeve, consequently, constitute cooperating members which may be moved relatively to each other to move the locking leaves into engagement with the spindle. The adjustment of the sleeve relatively to the locking bolt may be effected in any suitable or desired manner, and in the construction illustrated, a nut 40 is provided which engages the threaded portion 30 of the locking bolt. The draw bolt and sleeve 38, consequently, act as wedges to move the locking leaves against the spindle.

The locking leaves 36 are located intermediate of the ends of the collet and the outer surfaces thereof engage the slightly tapering portion 14 of the bore of the spindle and the cylindrical bore of the spindle at the inner end of the tapering portion 14, and consequently, the outer spindle engaging surfaces of the locking leaves 36 also have portions 44 which are inclined with reference to the axis of the spindle so as to fit snugly on the tapered surface 14 of the spindle and straight portions 41 which fit against the cylindrical portions of the spindle. This construction has the advantage that when the work stop is locked to the lathe spindle, any impact of the work against the stop member 25 will not tend to slide the locking mechanism lengthwise of the spindle because of the wedging action of the inclined portions 44 of the leaves with reference to the slightly tapered bore 14 of the spindle. Any impact against the stop member or the collet in the opposite direction will be opposed by the straight portions 41 which bear against the cylindrical portion of the spindle. Consequently the stop will be securely held on the spindle against movement in either direction.

In order to prevent the draw bolt from turning relatively to the sleeve, the draw bolt may be provided with a key or spline 42 formed to have a sliding fit in the keyway 43 of the sleeve.

It is desirable to provide means for holding the locking leaves 36 in operative relation to the collet when the collet is removed from the spindle. Any suitable means may be employed for this purpose, and in the construction illustrated, I have provided the sleeve 38 with undercut grooves or recesses 45 adjoining the slots into which the locking leaves extend, see particularly Figs. 3 and 7. The locking leaves are provided near their inner edges with projections 46 adapted to enter into the undercut recesses 45 to a sufficient extent to prevent the leaves from dropping out of the slots in the sleeve and the collet. These projections may be formed in any suitable or desired manner, and in the construction illustrated, I have provided the inner edges of the leaves with a pair of spaced slots 47 extending crosswise of the leaves, thus leaving a tongue between the slots, and this tongue may be bent over in any suitable manner to provide the projections 46 on each leaf extending toward one side thereof, which enters into the undercut groove 45 of the sleeve 38 when the leaf is slid into operative position through the open end of its slot. Any other means for holding the locking leaves against dislodgement from the collet may be provided. These projections, however, fit loosely in the undercut grooves so as not to interfere with the moving of the leaves into and out of engagement with the spindle, and do not extend laterally of the leaves to a sufficient extent to prevent insertion of the leaves through the slots 35 of the collet. The projections 46 also serve the further purpose of ensuring the assembling of the leaves in correct relation to the collet so that the taper at the outer surfaces of the leaves will correspond with the taper 14 in the bore of the spindle.

It will also be noted that the length of the leaves 36 is materially less than the length of the enlargements 35 of the slots of the collet. Consequently, after the work stop has been locked in the spindle, as shown in Figs. 2 and 3, by tightening the nut 40, the collet is free to move lengthwise to the necessary extent to grip the workpiece, such as 50, Fig. 2, and to release it.

In the operation of my improved stop mechanism, when the stop has been accurately positioned in and locked to the spindle 11 and the work stop member or screw 25 has been adjusted to the desired position, workpieces 50 may be fed between the jaws of the collet into engagement with the end of the stop member 25. As the collet is drawn to the left in Fig. 2 to grip the work, the stop mechanism does not move because of the fact that it is locked to the spindle. Consequently, even if the workpieces 50 vary in diameter, they will still always be gripped by the jaws of the collet in fixed relation to the end of the spindle. By means of the construction illustrated, the positioning of the workpieces will not vary more than a small fraction of a thousandth of an inch during the operation of the machine. The fact that the stop mechanism and the locking mechanism are located close to the work receiving end of the spindle also materially reduces inaccuracies in that there is less resilience of the parts of the stop and locking mechanism to contend with than would be the case if the stop were located at a considerable distance from the work receiving end of the spindle.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. In a work stop device for use with a machine having a rotary spindle and a collet extending into said spindle and having spring fingers spaced apart by slots, that improvement which comprises locking parts extending through said slots, and wedge means for forcing said locking parts outwardly into engagement with that portion of said spindle which extends about said collet, said locking parts being spaced from the ends of said slots to permit lengthwise movement of said collet relatively to said spindle and said locking parts.

2. In a work stop device for use with a machine having a rotary spindle and a collet extending into said spindle and having spring fingers spaced apart by slots, that improvement which comprises locking parts extending through said slots, a pair of relatively movable members having portions engaging said locking parts to move the same outwardly into engagement with said spindle, means for moving said movable members relatively to each other to wedge said locking parts in engagement with said spindle, one of said members having a work stop associated therewith, said locking parts, when in their operative positions in a spindle being spaced from the ends of said slots to permit movement of said collet into and out of work gripping positions.

3. In a work stop device for use with a machine having a rotary spindle and a collet extending into said spindle and having spring fingers spaced apart by slots, that improvement which comprises locking parts extending through said slots and having bevelled portions within said collet, a pair of members extending into said collet and having inclined portions engaging said bevelled end portions of said locking parts, said members being movable relatively to each other to force said locking parts outwardly into gripping engagement with said spindle by engagement of said inclined portions with said bevelled portions, said slots of said collet being longer than said locking parts to enable said collet to move lengthwise of said spindle when said locking parts are in locking positions.

4. In a work stop device for use with a machine having a rotary spindle and a collet extending into said spindle and having spring fingers spaced apart by slots, that improvement which comprises locking parts extending through said slots, a draw bolt in said collet, a sleeve on said draw bolt, cooperating wedge parts on said draw bolt and said sleeve for wedging said locking parts outwardly into engagement with said spindle when said sleeve and draw bolt are moved relatively to each other, and a nut having a threaded engagement with said draw bolt for producing relative motion of said draw bolt and said sleeve.

5. In a work stop device for use with a machine having a rotary spindle and a collet extending into said spindle and having spring fingers spaced apart by slots, that improvement which comprises locking leaves extending through said slots of said collet and of less length than said slots and having bevelled end portions within said collet, a draw bolt having a head provided with a substantially frusto-conical part formed to engage said bevelled portions of said leaves, a member extending about said draw bolt and movable relatively to the same and having portions formed to engage said leaves, means for moving said member toward the head of said draw bolt into engagement with said leaves for forcing said leaves outwardly into engagement with said spindle, said draw bolt having means thereon for engaging the work to limit the extent to which the same may be inserted into said collet.

6. In a work stop device for use with a machine having a rotary spindle and a collet extending into said spindle and having spring fingers spaced apart by slots, that improvement which comprises locking leaves extending through said slots of said collet and of less length than said slots and having bevelled end portions within said collet, a draw bolt having the head thereof arranged within said collet and shaped to cooperate with the bevelled end portion at one end of each of said leaves, a sleeve extending about said draw bolt and formed to engage the other bevelled end portion of each of said leaves, and means for moving said sleeve relatively to said draw bolt in a direction to force said leaves outwardly into engagement with said spindle, said draw bolt having means thereon for engaging the work to limit the extent to which the same may be inserted into said collet.

7. A work stop device according to claim 6 characterized in that said sleeve is provided with longitudinal radially extending slots terminating at one end thereof and into which the inner portions of said leaves extend, the portion of said sleeve at the ends of said slots being inclined to engage bevelled ends of said leaves for moving said leaves outwardly when said sleeve is moved toward said head of said draw bolt.

8. In a work stop device for use with a machine having a rotary spindle and a collet extending into said spindle and having spring fingers spaced apart by slots, that improvement which comprises locking leaves extending through said slots of said collet and of less length than said slots and having bevelled end portions within said collet, a draw bolt having a head arranged within said collet, said head having a substantially frusto-conical face arranged to engage one bevelled end of each of said leaves, a sleeve slidably mounted on said bolt and having slots extending inwardly from one end thereof into which said leaves may enter, the end walls of said slots being inclined to cooperate with the bevelled end portions of one of each of said leaves, said draw bolt having a threaded end extending beyond said sleeve, a nut on said threaded end engaging said sleeve for moving said sleeve toward the head of said bolt for forcing said leaves outwardly into engagement with said spindle, said draw bolt having means thereon for stopping work inserted into said collet.

9. A work stop device according to claim 8 characterized in that said slots in said sleeve have undercut portions at one side thereof and that said leaves have parts projecting into said undercut portion to limit the extent to which said leaves may move outwardly relatively to said sleeve.

10. A work stop device according to claim 8 characterized in that said slots in said sleeve have undercut portions at one side thereof and that said leaves each have a pair of slots cut crosswise from the inner edges thereof to form between them a tongue which is bent over beyond one side of said leaf to extend into said undercut portion of a groove of said sleeve.

11. A work stop device for use with a machine having a rotary spindle formed to cooperate with a collet having spring fingers spaced apart by slots, said spindle having a frusto-conical bore formed for engagement of the outer surfaces of the jaws of the collet and a slightly tapering bore into which the spring fingers of the collet may extend when the collet is in work releasing position, that improvement which comprises locking parts extending through said slots of said collet into position to engage said slightly tapering portion of said sleeve, means within said collet for forcing said locking parts outwardly into engagement with said slightly tapering bore of said spindle, said locking parts being spaced from the ends of said slots to permit lengthwise movement of said collet relatively to said spindle and said locking parts, and a work stop associated with said means for limiting the extent to which work may be inserted into said collet.

12. A work shop device according to claim 11, in which the locking parts are in the form of leaves having their outer faces tapering to engage the slightly tapering face of said spindle.

LEIGH R. EVANS.

REFERENCES CITED

The following references are of record in the file of this patent:

UNITED STATES PATENTS

| Number | Name | Date |
| --- | --- | --- |
| 1,014,051 | De Long | Jan. 9, 1912 |
| 1,365,453 | Burroughs | Jan. 11, 1921 |
| 1,455,554 | Stercklen | May 15, 1923 |
| 1,756,773 | Wendt | Apr. 29, 1930 |